United States Patent [19]

Taylor

[11] Patent Number: 4,634,202
[45] Date of Patent: Jan. 6, 1987

[54] COUPLING SYSTEM, ESPECIALLY FOR A CONNECTOR

[75] Inventor: Derek Taylor, Canterbury, England

[73] Assignee: Allied Corporation, Morris Township, Morris County, N.J.

[21] Appl. No.: 581,474

[22] Filed: Feb. 17, 1984

[30] Foreign Application Priority Data

Feb. 22, 1983 [GB] United Kingdom ............... 8304942

[51] Int. Cl.⁴ ................ H01R 25/00; G02B 6/36; G02B 7/26
[52] U.S. Cl. ................... 339/49 R; 285/67; 403/340; 403/353; 350/96.2
[58] Field of Search .......... 339/47 R, 48, 49 R, 339/49 B, 94 R, 94 M, 45 R, 45 M, 91 R; 350/96.2, 96.21, 96.22; 403/339–341, 353; 285/67, 325

[56] References Cited

U.S. PATENT DOCUMENTS

| 867,312 | 10/1907 | Shutz ................................ 403/341 |
| 1,391,364 | 9/1921 | Bulow ............................... 403/340 |
| 4,184,742 | 1/1980 | Corrales .......................... 350/96.21 |
| 4,204,188 | 5/1980 | Welchart et al. ............. 339/47 R X |
| 4,208,095 | 6/1980 | Malsot ......................... 350/96.22 X |
| 4,289,366 | 9/1981 | Marks ................................ 339/49 |

FOREIGN PATENT DOCUMENTS

| 573890 | 12/1945 | United Kingdom ................ 285/325 |
| 1567636 | 10/1976 | United Kingdom . |
| 1538801 | 2/1977 | United Kingdom . |

OTHER PUBLICATIONS

Japanese Patent Abstract 54-21, 356.

*Primary Examiner*—Gil Weidenfeld
*Assistant Examiner*—Steven C. Bishop
*Attorney, Agent, or Firm*—Roger H. Criss; Anibal J. Cortina; C. D. Lacina

[57] ABSTRACT

A hermaphroditic coupling system, especially for an optical fibre (or electrical) connector member. The connector member 10 has a body 12 with a cylindrical portion 14 and a semi-cylindrical extension 16, defining a stepped end profile comprising rearward and forward spaced parallel semi-annular transverse surfaces 24, 26 and a planar portion 22 between them, this structure having 180° rotational symmetry about a transverse axis 56. A channel 20 is formed in the extension 16 as a continuation of a bore 18 in the portion 14 forming a recess. A boss 32 is in the channel 20 and has a projecting end 34 projecting forwardly of surface 26. A domed abutment surface 44 on an abutment member 42 resiliently mounted by a spring 40 at the rear of the boss faces rearwardly towards the bore 18. The space 50 between the boss 32 and the end surface 24 of the body portion 14 is sufficient to receive laterally the boss on an opposed identical connector member 58 when the abutment members are depressed. When the connectors are axially aligned they move together longitudinally under the action of the springs 40 to engage the projecting end 34 of the boss 32 in the end of the bore 18. The connector member is of simple construction and can provide both a snap-in and a snatch-release capability.

21 Claims, 8 Drawing Figures

COUPLING SYSTEM, ESPECIALLY FOR A CONNECTOR

BACKGROUND OF THE INVENTION

1. Field of the Invention

This invention relates to hermaphroditic coupling systems, and is particurlarly suitable for use in hermaphroditic connectors for connecting electrical conductors or optical fibres.

2. Description of the Prior Art

A hermaphroditic connector member is one which can be connected to another connector member identical to itself.

Although many different types of hermaphroditic coupling systems have been proposed, it would be desirable to provide a hermaphroditic coupling member which is extrememy simple to couple and which can be used in low temperature environments with gloved hands. Furthermore, it would be desirable to provide a hermaphroditic connector which is relatively small and can minimize the strain on a cable in which it is used as an in-line connector, yet is robust and can withstand rough handling.

SUMMARY OF THE INVENTION

In accordance with this invention, there is provided a hermaphroditic coupling member comprising a mating surface which in the mated condition of the member has 180° rotational synmetry about a transverse axis of the coupling member, the coupling member having a similarly-symmetrical first and second locking conformations such that the first and second locking conformations engage the second and first locking conformartions respectively on another identical coupling member when the coupling member is fully mated with the other coupling member but disengage upon limited separation of the coupling members in a principal mating direction orthogonal to the transverse axis, and the coupling member includes resilient means constructed and located to urge the two members towards their fully-mated condition. Preferably, the coupling member comprises an optical fibre or elecrtrical connector member.

Also in accordance with this invention, there is provided a hermaphroditic optical fibre or electrical connector member, comprising a body having a stepped end profile comprising two spaced parallel semi-annular transverse surfaces at the forward and rearward ends of a longitudinal planar portion which lies between them; and an axial longitudinal channel formed on the planar portion; an axial member at the forward end of the channel; a recess, and a projection sized so as to engage with the corresponding recess on an opposed identical connector member, located one one the axial member and the other at the rearward end of the channel, and an abutment surface at the rear end of the axial member, the abutment surface being formed on an abutment member which is resiliently urged in a rearwardly direction; the axial space between the axial member and the rearward transverse surface being sufficient to receive laterally the axial member on an opposed identical connector member when the said abutment surfaces of the connector members are displaced against their resilient bias.

BRIEF DESCRIPTION OF THE DRAWINGS

The invention will now be further described, by way of example, with reference to the accompanying drawings, in which.

Figure 1:
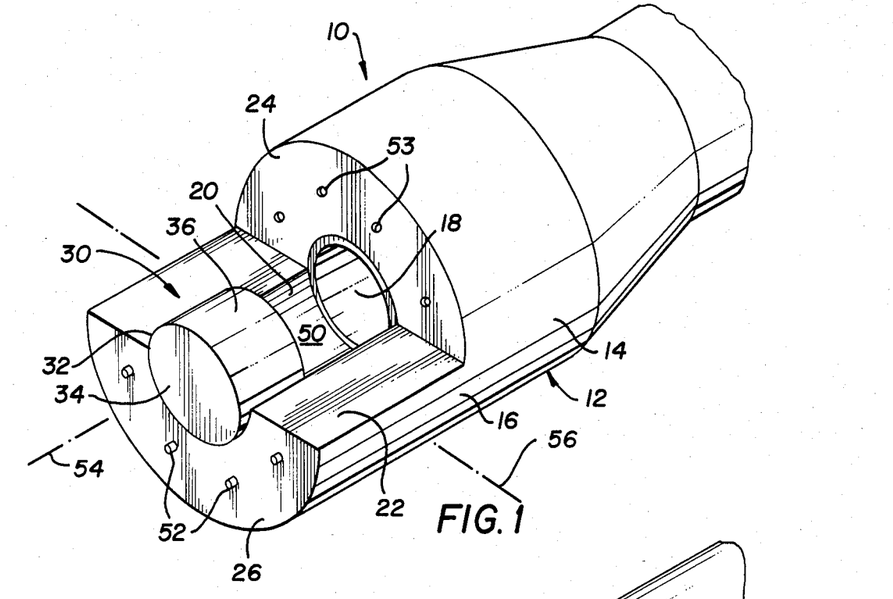
FIG. 1 is a perspective view of an optical fibre connector member embodying the invention.
Figure 2:
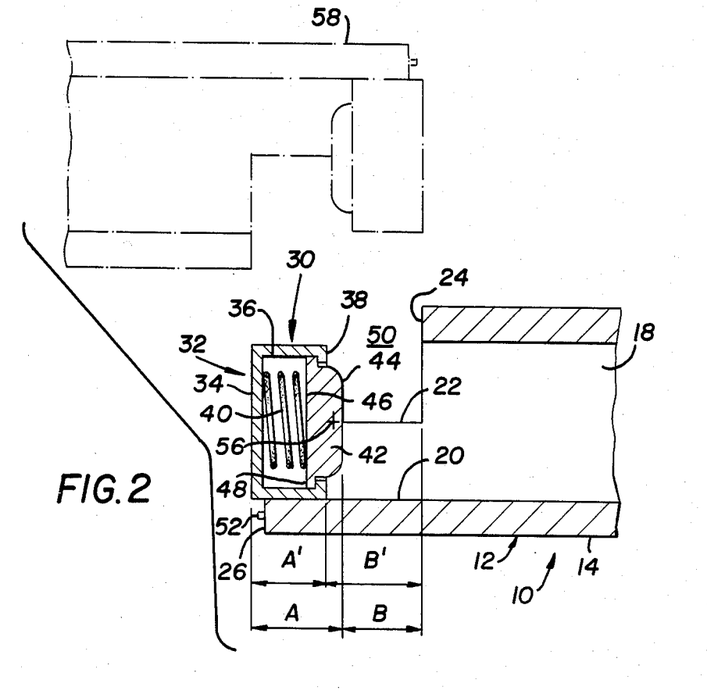
FIG. 2 is a sectional view of the connector member of FIG. 1 with a second member shown in outline, the section not passing through fibres of the connector member.
Figure 3:
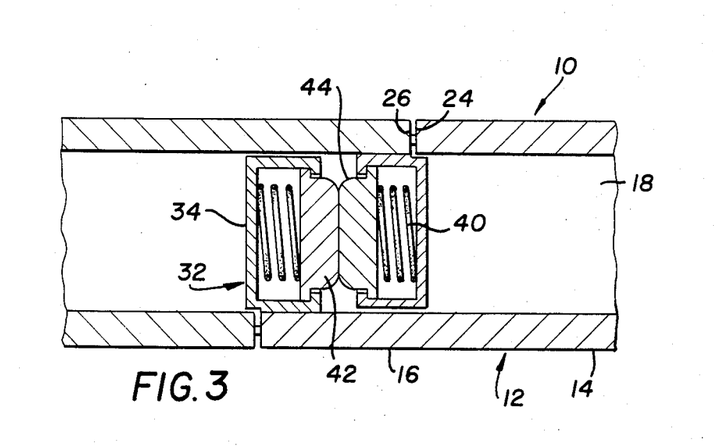
FIG. 3 is a sectional view of two coupled connector members.

With reference to FIGS. 1 to 3 of the drawings, the hermaphroditic connector part or member generally indicated as 10 comprises a cylindrical body 12 having a body portion 14 of annular section and a projecting portion 16 which is semi-annular in cross-section. The body portion 14 and the projecting portion 16 are coaxial, of the same diameter, and are integrally formed. The bore 18 of the body portion 14 and the channel 20 of the projecting extension 16 are of the same diameter, and are aligned.

The general shape of the end of the body 12 is thus stepped and comprises a transverse substantially planar portion 22, a first semi-annular surface 24 being the end of the cylindrical body portion 14, and a second semi-annular surface 26 being the end of the projecting portion 16. The two surfaces 24, 26 are parallel to each other and, as shown, are also perpendicular to the planar portion 22.

Disposed at the outer end of the projecting protion 16, that is, at the end remote from the cylindrical body portion 14, is a coupling assembly generally indicated as 30. The coupling assembly comprises a circular cylindrical boss 32, of diameter slightly less than the diameter of the channel 20, glued or otherwise fixed into the channel 20 such that the outer end 34 of the boss projects beyond the end 26 of the projecting portion 16 of the body 12. The boss 32 has a peripheral wall portion 36, extending from its outer end 34 back part-way towards the cylindrical body portion 14, the wall portion 36 having an inwardly turned lip 38 (FIG. 2) behind which the remaining parts of the coupling assembly 30 are entrapped. These parts are a helical spring 40, and a cap 42, which has a convex or domed surface 44 facing rearwardly towards the hollow cylindrical body portion 14. The spring 40 is located between the inner face of the outer end 34 of the boss 32 and the widened flat inner face 46 of the cap 42. The cap 42 and spring 40 are trapped by means of a flange portion 48 around the periphery of the cap 42, in co-operation with the lip 38 of the boss 32.

Thus, there is formed between the domed surface 44 of the cap 42 and the surface 24 of the body portion 14 a space 50. The axial length A of the coupling assembly 30 slightly exceeds the remaining length B of the channel 20, but the assembly is sufficiently compressible against the spring 40 for a compressed axial length A' not to exceed the new remaining channel length B'. The coupling assembly 30 is so dimensioned that when a second connector is brought up to the first connector, the domed surface 44 of the respective caps 42 may abut one another.

Optical fibres run parallel to the axis of the connector member in a symmetrical array within the wall of the connector body. Fibres 52 are shown (FIGS. 1 and 2) projecting beyond the end 26 of the projecting portion 16 of the connector member. The ends of longitudinal bores 53, each of which houses a fibre, are shown (FIG. 1) at the end 24 of the cylindrical body portion 14. These latter fibres terminate before reaching the end 24, the distance between their ends and the end 24 slightly exceeding the distance by which the fibres 52 project beyond the end 26 of the projecting portion 16. When the connector members are coupled to form the connector of FIG. 3, the fibres of the respective connector members are in optical alignment, with the projecting parts of the fibres 52 within the opposed bores 53.

It will be seen that the connector system has a principal axis 54 which is its longitudinal axis, and also a transverse axis 56 orthogonal to the principal axis and about which the mating surfaces of the connector exhibit 180° rotational symmetry. Thus in the connector part 10 illustrated in FIGS. 1 to 3, there is a stepped mating surface comprising the central substantially planar portion 22, intersecting the transverse axis 56, and the first and second semi-annular surfaces 24 and 26, these being parallel to each other end, in the illustrated and preferred example, perpendicular to the planar portion 22. The boss 32 and space 50 maintain this rotational symmetry. Other shapes could however in principle be provided for the mating surface provided only that the 180° rotational symmetry about axis 56 exists and providing that the projecting end 34 of the boss 32 is capable of being retained in engagement with the bore 18 on an associated coupled connector member as wil be described in more detail below. The shape shown is however particularly desirable because it is relatively easy to form by machining from cylindrical metal section. Furthermore the flat surfaces 24, 26 are accessible to be wiped clean before a connection is made.

To couple two connector members together the first connector member 10 and a second connector member 58 are positioned side by side as indicated in FIG. 2. The two members are then moved laterally together and first the projecting end 34 of the boss 32 on each member will bear against the surface 24 at the end of the cylindrical body portion 14 of the body 12. As they are moved closer togther, the domed surfaces 44 of the caps 42 of the two members will bear against each other and the caps 42 will be forced back against the springs 40, which will be compressed. The domed shape of the surfaces 44 of the 42 is such as to facilitate this transverse sliding movement. Eventually the two connector members will reach a position in which they are axially aligned on the longitudinal axis 54. When this happens each projection 34 will be able to move into the end of the opposes bore 18 and the two connector members will be pushed by the expanding springs 40 into their fully mated condition, as shown in FIG. 3. In this condition the surface 24 on one connector member closely abuts the surface 26 on the other connector members, and the central planar portions 22 also bear against one another. The optical fibres 52 on the two connector members are thus aligned, with the parts of fibres 52, projecting from the semi-annular surface 26 positioned within the bores 53 at the surfaces 24. Transmission can thus take place between the fibres so aligned.

It is seen that in this way the coupling system provides for the mating surfaces 24 and 26 to be held apart until the connector members are axially aligned, enabling connector members to be used which have delicate components projecting beyond the mating surfaces 24 and 26, e.g., the fibres 52 in the example described above. Moreover, the coupling operation is achieved very simply with a snap-in action. This is facilitated by having the compressive resilient force applied to a rearwardly facing portion, i.e. the surface 44 of cap 42 of the connector member.

When in the coupled condition, the boss 32 engages in the channel 20 of the opposed connector member as its projecting end 34 engages in bore 18 and ensures transverse alignment of the two connector parts. The projecting end 34 is restrained from lateral outward movement by the wall of the cylindrical body portion 14, particularly that part of the wall diametrically opposed to the semi-cylindrical portion 16, or the uppermost part as seen in FIG. 1.

Figure 4:
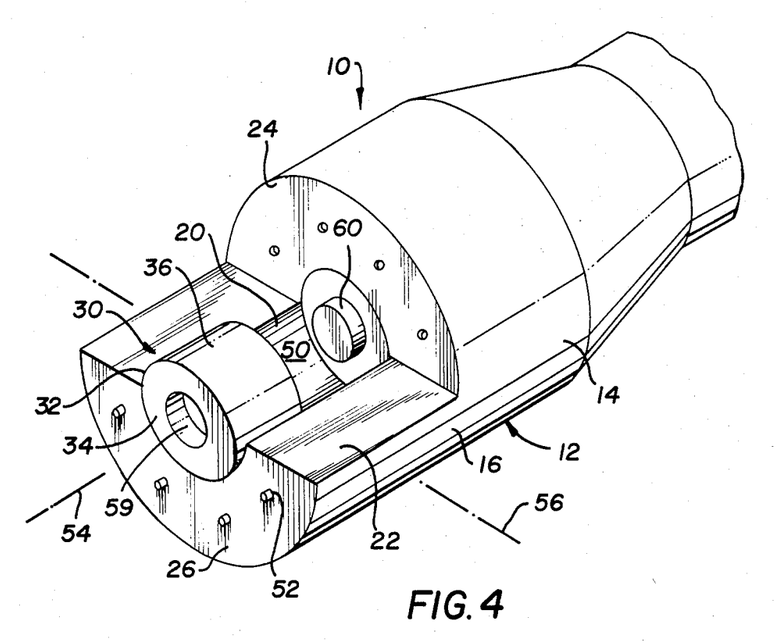
FIG. 4 is a perspective view of a second connector member embodying the invention.

The purpose of the bore 18 is simply to provide a recess to receive the boss 32, and indeed in the alternative construction shown in FIG. 4 the projection and recess can be inter changed so that there is a recess 59 defined at the end 34 of the boss 32, and a projection 60 extending from the end 24 of the cylindrical body portion 14, the projection 60 taking the place of the bore 18. With either embodiment a locking conformation is provided which inhibits separation of the connector members so long as they remain in the longitudinal relationship of the type shown in FIG. 3.

The coupling operation is extremely simple and lends itself to situations where coupling is required in a low-temperature environment with gloved hands. No screw or bayonnet coupling is necessary to ensure proper mating of the connector parts.

The connector can be small in bulk and thus can minimize the strain on a cable in which it is used as an in-line connector. Nevertheless it is robust and can be made to withstand rough handling.

To uncouple the connector members all that is necessary is to pull them apart axially compressing the springs 40 sufficiently to disengage the projecting end 34 of the boss 32 from the end of the bore 18. The connector members 10, 58 will then move apart transversely and separate. It is thus seen that the connector has a 'snatch disconnect' property, and can be used in particular circumstances where this is required, e.g. for attaching a motor cyclist's headphones to his machine. Accidental uncoupling by an inadvertent longitudinal pull may be prevented by providing the connector, or each connector member, with an outer sleeve which has a locking and unlocking mode.

Figure 5:
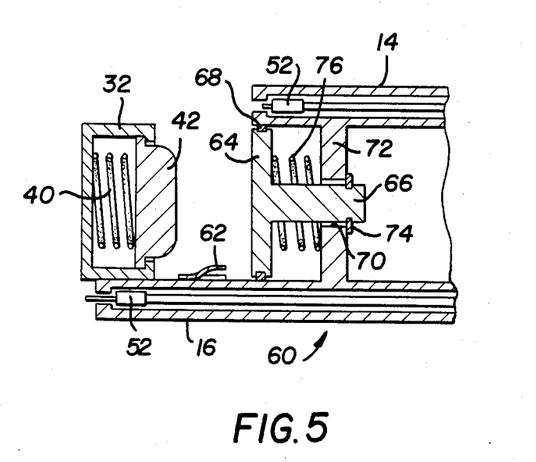
FIG. 5 is a sectional view of a third connector member embodying the invention, the section passing through fibres of the connector member.

A third connector member 60 embodying the invention is shown in FIG. 5. This differs from the first embodiment in two ways. Firstly, there is provided a leaf spring 62 to assist uncoupling of two mated connector members. This spring 62 is provided for ensuring decoupling upon an axial pull, though in practice it may not normally be necessary. Secondly, there is provided sealing means to resist the ingress of foreign matter into the bore 18 of the cylindrical body portion 14.

The sealing means comprises a plate 64 and a stub 66 integral therewith and projecting rearwardly from the plate into the bore 18. The plate is slidable within the bore 18 and has an O-ring seal 68 around its periphery in sealing contact with the bore. A part of the stub 66 is located within an aperture 70 formed centrally in a seating 72, which is integral with the wall of the hollow cylinder body portion 14. The stub and plate are thereby constrained to move along the axis of the bore. On the free end of the stub 66 is located an abutment washer 74 to engage the side of the seating 72 remote from the projecting portion 16 and thereby retain the plate and stub within the bore 18.

Between the plate 64 and the seating 72 is located a spring 76 of lower spring force than the spring 40 of the coupling assembly.

In FIG. 5, two optical fibres 52 are shown, diametrically disposed to one another within the wall of the connector member.

Figure 6:
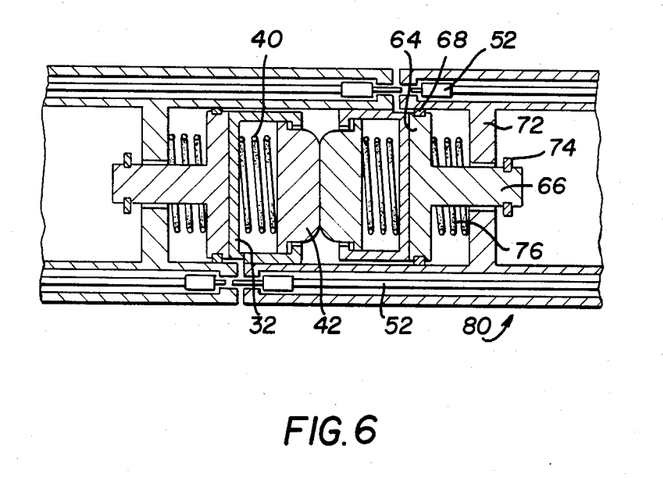
FIG. 6 is a sectional view of two coupled connector members of similar type to that shown in FIG. 5.

The mated connector members 80 of FIG. 6 differ from the connector members of FIG. 5 only in that no leaf springs 62 are provided. The two connector members are coupled together in the manner which has been described above with reference to FIG. 3. Unlike the connector members of FIG. 3, the springs 40 of the coupled connectors cannot fully relax. When they begin to relax, the springs 76 are compressed, opposing further relaxation. The springs 40, 76 reach a state of equilibrium whereby they are subject to an equal compressive force. The springs 40 can, however, relax sufficiently to enable the bosses 32 to be received in the ends of their respective bores 18.

Figure 7:
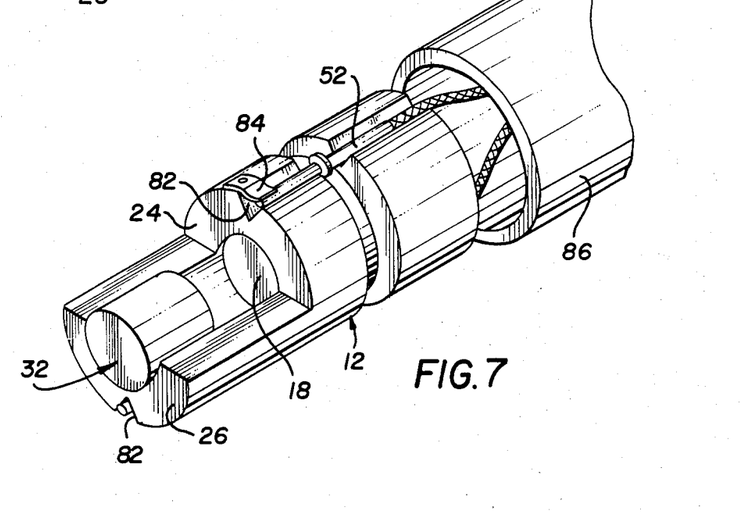
FIG. 7 is a perspective view of a fourth connector member embodying the invention.

FIG. 7 shows a connector member similar to that described with reference to FIGS. 1 to 3, but with a different arrangement of the optical fibres. The fibres 52, two of which are shown in the drawing, are disposed in longitudinal V-shaped notches 82 formed at the surface of the connector body 12. Optical fibres 52 project beyond the semi-annular surfaces 26 and terminate before reaching the semi-annular surface 24. The ends of notches 82 adjacent the surface 24 are covered with leaf springs 84. After joining two such connectors in the manner previously described a sleeve 86 may be slid to cover and protect the fibres 52 in the region of the join. When the sleeve 86 is in position the members cannot be uncoupled, so the snatch disconnect facility is of course lost.

The connector members described are formed of brass, although other suitable materials, metallic and non-metallic such as plastics, may be used. Belleville springs may be used instead of the helical springs 40, 76, described.

A connector embodying the invention can also be used to join electrical conductors. In one embodiment the cylindrical and non-cylindrical parts are of insulating, plastics material and conduction occurs through the metallic parts which comprise the coupling assembly. The connection between an electrical line and the boss of the connector may be achieved by a simple plug and socket contact arrangement.

Figure 8:
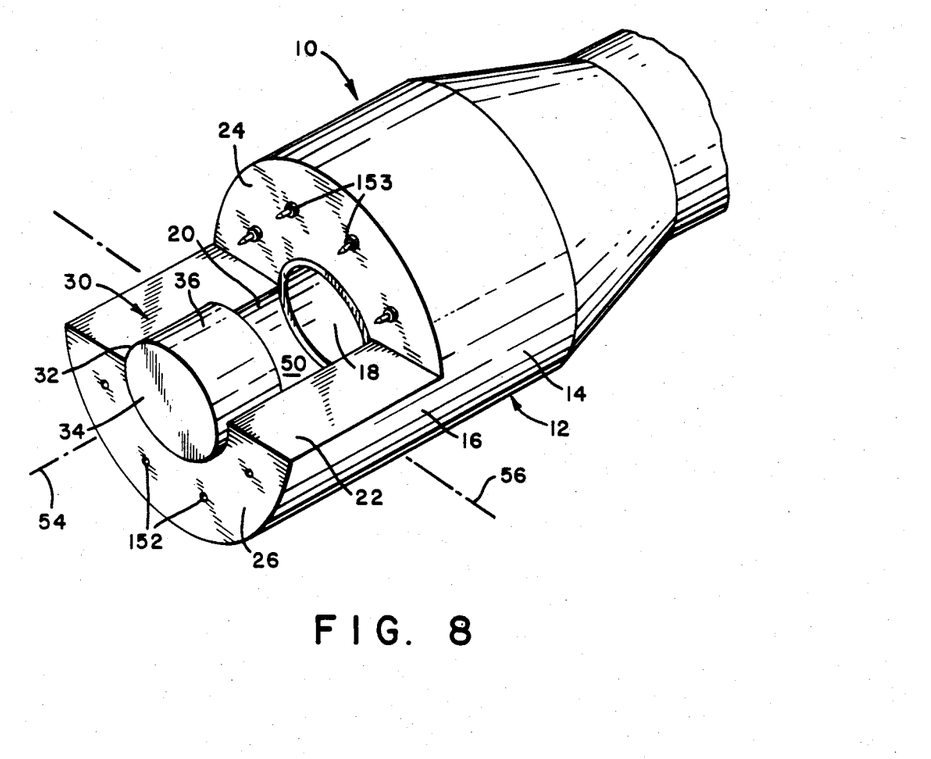
FIG. 8 is a view similar to FIG. 1, but of an electrical connector.

However in a preferred alternative arrangement shown in FIG. 8 electrical plug and socket type contact members are substituted for the optical fibre terminations shown around the periphery of the body member 12 in the embodiments of FIGS. 1 to 6. Conveniently the contacts opening onto the end surface 24 of the cylindrical body portion will be of the plug type 153 while those openings onto the end surface 26 of the projecting extension will be of the socket type 152.

Many other embodiments of connectors according to the invention, for use with optical or electrical systems, can be envisaged. Different arrangements of coupling assembly are possible, and the invention is not limited to the use of circular cylindrical sections, although these may often be the most convenient embodiments of the invention. For example, elliptical or rectangular section connectors could be used. Finally, the coupling system could have application for other purposes, e.g. for coupling hydraulic lines.

We claim:

1. A hermaphroditic coupling member comprising:
   a body having an exterior surface and a longitudinal axis;
   a mating surface defining a portion of said exterior surface, said mating surface adapted to mate with a complementary mating surface on an identical coupling member;
   first and second locking conformations provided in said body and engageable with identical first and second locking conformations in said identical coupling member such that said first locking conformation of said coupling member engages the second locking conformation on said identical coupling member and said second locking conformaiton of said coupling member engages the first locking conformation on said identical coupling member; and
   resilient means mounted in said body and urging one of said first and second locking conformations into a first position at which it is operable to engage the respective locking conformation on said identical coupling member, said one of said first and second locking coformations being movable against said urging of said resilient means along said longitudinal axis into a second position at which it is operable to release the respective locking conformation of said identical coupling member, said one of said first and second locking conformations being moved into its second position upon limited movement of said coupling member along said longitudinal axis away from said identical coupling member after said coupling members are mated, whereby said coupling member is disengaged from said identical coupling member.

2. A coupling member according to claim 1, wherein said resilient means comprises a compressively resilient structure and said mating surface comprises a portion facing rearwardly on said body, said portion being biased by said resilient means, and including means for transversely receiving said identical coupling member in said coupling member under compression of said resilient means when said coupling members are mated so that they are in axial alignment with one another, and said resilient means being effective to move said portion into a locked position at which it retains said identical coupling member.

3. A coupling member according to claim 2, wherein said locking conformations comprise a longitudinal projection and a longitudinal recess, said body having a forward end and a rearward end, one of said locking conformations being located on said longitudinal axis at said forward end of said body and the other of said locking conformations being located on said longitudinal axis at said rearward end of said body and being rearwardly of and opposed to said rearwardly-facing portion of said mating surface.

4. A coupling member according to claim 3, wherein said coupling member comprises an optical fibre connector member.

5. A coupling member according to claim 3, wherein said coupling member comprises an electrical connector member.

6. A hermaphroditic optical fibre connector member, said connector member having a loinigitudinal axis and comprising: a body having a stepped end profile comprising a forward semi-annular transverse surface, a rearward semi-annular transverse surface spaced from and parallel to said forward transverse surface, and a longitudinal planar portion lying between said transverse surfaces and extending along said longitudinal axis;
- an axial longitudinal channel formed on said planar portion and having a forward end and a rearward end;
- an axial member having a forward end and a rearward end and being located at said forward end of said channel;
- a recess and a projection, one of said recess and projection being located on said axial member and the other being located at said rearward end of said channel;
- said axial member comprising a movable abutment member;
- biasing means resiliently urging said abutment member in a rearwardly direction, said abutment member being movable in a forwardly direction against said urging;
- an abutment surface formed on said abutment member and located at said rearward end of said axial member; and
- an axial space between said axial member and said rearward transverse surface,
- said connector member being adapted for mating with an identical connector member,
- whereby when said connector member and said identical connector member are mated, said abutment surfaces on said connector member and said identical connector member are displaced against their resilient urging, said axial space laterally receives the axial member of said identical connector member, and said projection engages the corresponding recess on said identical connector member, and whereby when a force is applied along said longitudinal axis, said abutment member is moved in its forwardly direction to permit disengagement of said connector member and said identical connecting member.

7. A connector member according to claim 6, including a sleeve member slidably mounted on said body for movement between locked and free positions, said sleeve member being effective in its locked position to retain said connector member and said identical connector member in mated condition.

8. A connector member according to claim 6, wherein said abutment surface is domed.

9. A connector member according to claim 6, wherein said axial member is a hollow boss and said abutment member is retained in and protrudes from the rearward portion of said boss.

10. A connector member according to claim 9, wherein said projection is on said axial member and projects forwardly of said forward transverse surface, and said recess is at said rearward end of said channel.

11. A connector member according to claim 6, including a sealing member slidably mounted in said recess and biased outwardly of said recess to resist the ingress of contaminants into said recess.

12. A connector member according to claim 6, including resilient ejecting means for urging the axial member on said identical connector member laterally outwardly of said channel upon disengagement of said locking conformations.

13. A connector member according to claim 12, wherein said resilient ejecting means comprises a leaf spring in the base of said channel longitudinally between said abutment surface and said rearward transverse surface.

14. A connector member according to claim 6, wherein optical fibers are disposed radially around said body in such an array as to provide alignment of fibres when said connector members are mated.

15. A connector according to claim 14, including notches disposed at the outer periphery of said body, with said fibres being located in said notches, and further including means for protecting the optical fibres after mating of said connector member and said identical connector member.

16. A connector member according to claim 15, including a leaf spring across the top of at least one notch and means slidable over said connector member.

17. A connector member according to claim 6, wherein said body has a circularly cylindrical outer periphery.

18. A connector member according to claim 6, wherein optical fibers are arranged on each of said semi-annular transverse surfaces.

19. A connector member according to claim 6, wherein said projection is on said axial member and projects forwardly of said forward transverse surface, and said recess is at said rearward end of the channel.

20. A hermaphroditic electrical connector member, said connector member having a longitudinal axis and comprising:
- a body having a stepped end profile comprising a forward semi-annular transverse surface, a rearward semi-annular transverse surface spaced from and parallel to said forward transverse surface, and a longitudinal planar portion lying between said transverse surfaces and extending along said longitudinal axis;
- an axial longitudinal channel formed on said planar portion and having a forward end and a rearward end;
- an axial member having a forward end and a rearward end and being located at said forward end of said channel;
- a recess and a projection, one of said recess and projection being located on said axial member and the other being located at said rearward end of said channel;
- said axial member comprising a movable abutment member;
- biasing means resiliently urging said abutment member in a rearwardly direction, said abutment member being movable in a forwardly direction against said urging;
- an abutment surface formed on said abutment member and located at said rearward end of said axial member; and
- an axial space between said axial member and said rearward transverse surface, said connector member being adapted for mating with an identical connector member, whereby when said connector member and said identical connector member are mated, said abutment surfaces on said connector member and said identical connector member are displaced against their resilient urging, said axial space laterally receives the axial member of said identical connector member, and said projection engages the corresponding recess on said identical connector member, and whereby when a force is applied along said longitudinal axis, said abutment member is moved in its forwardly direction to permit disengagement of said connector member and said identical connecting member.

21. A connector member according to claim 20, wherein said abutment surface is domed, and wherein said projection is on said axial member and projects forwardly of said forward transverse surface, and said recess is at said rearward end of said channel.

* * * * *